(12) United States Patent
Sheedy et al.

(10) Patent No.: US 11,888,882 B2
(45) Date of Patent: *Jan. 30, 2024

(54) NETWORK TRAFFIC CORRELATION ENGINE

(71) Applicant: Bank of America Corporation, Charlotte, NC (US)

(72) Inventors: Jonathan Sheedy, Poynton (GB); Steven E. Sinks, Scottsdale, AZ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,094

(22) Filed: Jan. 18, 2023

(65) Prior Publication Data

US 2023/0156029 A1    May 18, 2023

Related U.S. Application Data

(63) Continuation of application No. 17/003,033, filed on Aug. 26, 2020, now Pat. No. 11,601,457.

(51) Int. Cl.

| | |
|---|---|
| *H04L 12/00* | (2006.01) |
| *H04L 9/40* | (2022.01) |
| *H04L 41/0686* | (2022.01) |
| *H04L 41/0631* | (2022.01) |
| *G06F 21/55* | (2013.01) |
| *H04L 43/062* | (2022.01) |

(52) U.S. Cl.
CPC ...... *H04L 63/1425* (2013.01); *H04L 41/0686* (2013.01); *G06F 21/552* (2013.01); *H04L 41/0631* (2013.01); *H04L 43/062* (2013.01); *H04L 63/1408* (2013.01)

(58) Field of Classification Search
CPC ............. H04L 63/1425; H04L 41/0686; H04L 41/0631; H04L 63/1408; H04L 43/062; G06F 21/552
USPC .................................................. 709/223–226
See application file for complete search history.

(56) References Cited

U.S. PATENT DOCUMENTS

| | | |
|---|---|---|
| 6,721,689 B2 * | 4/2004 | Markle ............... H04L 41/0213 702/183 |
| 7,152,242 B2 | 12/2006 | Douglas |
| 7,447,768 B2 | 11/2008 | Kelly et al. |
| 7,934,253 B2 | 4/2011 | Overcash et al. |
| 9,003,528 B2 | 4/2015 | Stolfo |
| 9,055,090 B2 | 6/2015 | Delatorre et al. |
| 9,143,518 B2 | 9/2015 | Sidiroglou et al. |

(Continued)

*Primary Examiner* — Frantz Coby
(74) *Attorney, Agent, or Firm* — Banner & Witcoff, Ltd.

(57) ABSTRACT

A network traffic correlation engine monitors inbound and/or outbound connection information received from on each host computer system on a network. Each host device on the network store data logs corresponding to information corresponding to communications sent by the device and received by the device. The network traffic correlation engine correlates connections between different hosts throughout the network. If the network traffic correlation engine identified unmatched outbound and inbound connections, the network traffic correlation engine generates an alert to initiate further investigation and may also provide a mapping of the communications showing a possible start device for the connection and/or a type of access that the connections may now be providing.

20 Claims, 4 Drawing Sheets

(56) References Cited

U.S. PATENT DOCUMENTS

| | | | |
|---|---|---|---|
| 9,204,293 B2 | 12/2015 | Imbimbo et al. | |
| 9,215,244 B2 | 12/2015 | Ayyagari et al. | |
| 9,392,007 B2 | 7/2016 | Giokas | |
| 9,397,880 B1 | 7/2016 | Lee et al. | |
| 9,654,478 B2 | 5/2017 | Stolfo et al. | |
| 9,762,596 B2 | 9/2017 | Wang et al. | |
| 10,146,939 B2 | 12/2018 | Stolfo et al. | |
| 10,152,596 B2 | 12/2018 | Pieczul | |
| 10,237,290 B2 * | 3/2019 | Balakrishnan | H04L 63/1425 |
| 10,270,789 B2 | 4/2019 | Singh | |
| 10,291,506 B2 | 5/2019 | Mixer et al. | |
| 10,362,057 B1 | 7/2019 | Wu | |
| 10,372,906 B2 | 8/2019 | Pieczul | |
| 10,417,888 B2 | 9/2019 | Emmanuel et al. | |
| 10,536,482 B2 | 1/2020 | Gabaev et al. | |
| 10,560,487 B2 | 2/2020 | Shulman-Peleg et al. | |
| 10,574,512 B1 * | 2/2020 | Mermoud | H04L 41/5009 |
| 10,798,114 B2 | 10/2020 | Galula et al. | |
| 10,965,516 B2 * | 3/2021 | Fenoglio | H04L 41/22 |
| 11,277,420 B2 * | 3/2022 | Côté | G06N 3/08 |
| 11,601,457 B2 * | 3/2023 | Sheedy | H04L 43/062 |
| 2015/0229661 A1 * | 8/2015 | Balabine | H04L 43/04 |
| | | | 726/22 |
| 2015/0312273 A1 | 10/2015 | Pappu et al. | |
| 2017/0289191 A1 | 10/2017 | Thioux et al. | |
| 2019/0306011 A1 | 10/2019 | Fenoglio et al. | |
| 2021/0120027 A1 | 4/2021 | Dean et al. | |

\* cited by examiner

NETWORK TRAFFIC CORRELATION ENGINE

CROSS REFERENCE TO RELATED APPLICATION(S)

This application is a continuation of and claims priority to U.S. patent application Ser. No. 17/003,033 entitled "Network Traffic Correlation Engine" filed on Aug. 26, 2020, which is incorporated by reference in its entirety.

BACKGROUND

Unauthorized individuals may attempt to navigate through a compromised environment to obtain increased privileges using various tools. Network communications between devices, such as lateral movement between host computing devices may allow a threat actor to avoid detection and retain access, such as in cases where a network user attempts unauthorized access, even if discovered on the machine first accessed (e.g., "patient zero"). After gaining initial access to a machine on a network, unauthorized individuals may impersonate a legitimate user to move through multiple systems in the network. This involves gathering information about multiple systems, obtaining credentials, escalating privileges, and gaining access to the sensitive data and resources. In a case of an inside threat, a network user may attempt to access, obtain credentials or otherwise use their credentials to gain unauthorized access to restricted data and/or resources.

Current methods used to protect enterprise computing systems (e.g., corporate computing networks, education institution computing networks, government computing networks, and the like) have a difficult time identifying in real time lateral movement between hosts (e.g., host to host communication rather than host to server or server to host communication) that may be associated with a network intruder and/or malicious inside threat. As such, identifying whether traffic to and from a host machine on a network is legitimate (e.g., a technical support person performing activities related to their job) or illegitimate (e.g., network traffic requiring additional investigation) has been difficult. Currently very few controls are capable of real time network traffic validation, such as associating a user and device type to a particular connection. Further, passive tools such as event logs may not directly correlate, in real time, host to host communication. As such, system administrators may use external add-on tools that are capable of pulling event logs to link a particular message and/or action to a user or computing device.

Other controls, such as Host Based Intrusion Detection solutions (HIDS) may search for known patterns in the network traffic connections coming in and out of a single host but are not capable of identifying users utilizing legitimate host based and network-based tools to make unauthorized connections (also known in the threat actor community as living off the land). As such, a HIDS solution is better suited to monitoring and analyzing the internals of a single computing system, the network packets on its network interfaces and the content of otherwise encrypted communications to make decisions about possible, ongoing, and/or successful attacks against that individual host. Further, antivirus and/or anti-malware tools may also rely on the use of known patterns in possible malware, but are not very successful at identifying nefarious custom software or potentially malicious network communications that utilize normal network communication or host to host based connections

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity. For example, aspects of the disclosure relate to cyber security for enterprise computing systems. One or more aspects of the disclosure relate to monitoring network communications by a network traffic correlation engine to match incoming and outgoing messages at a host device to identify hosts suspected of being compromised.

A network traffic correlation engine monitors inbound and/or outbound connection information received from each host computer system on a network. Each host device on the network store data logs corresponding to information related to communications sent by the device and received by the device. The network traffic correlation engine correlates connections between different hosts throughout the network. If the network traffic correlation engine identified unmatched outbound and inbound connections, the network traffic correlation engine may generate an alert to initiate further investigation and may also provide a mapping of the communications showing a possible start device for the connection, credentials used to establish the connection, and/or a type of access that the connections may now be providing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
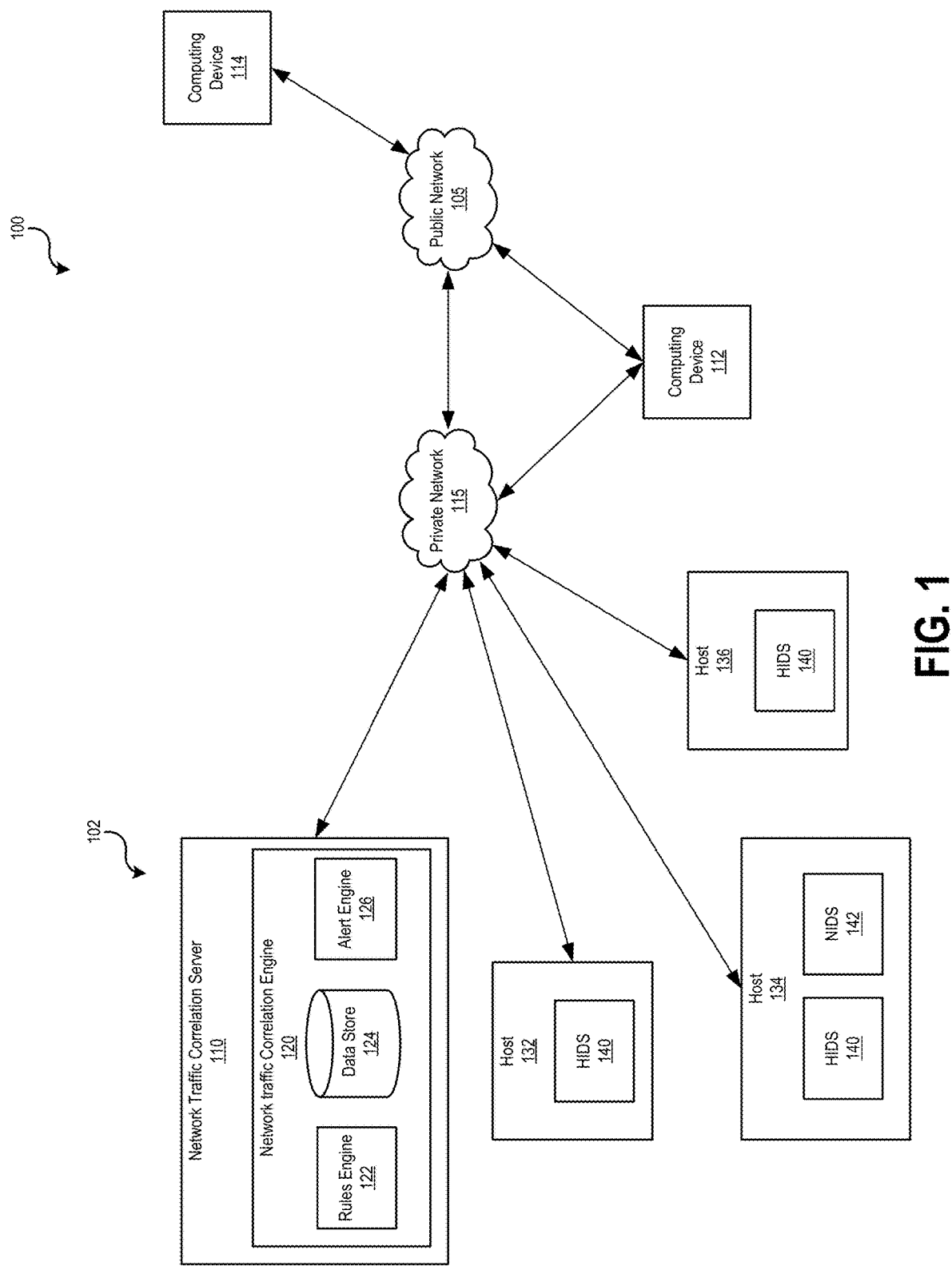
FIG. 1 shows an illustrative computing environment to correlate network messages between host devices in a networked computing environment in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary computers, nodes, personal computers, portable electronic devices, servers, worker computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, and the like.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the invention.

Host-based Intrusion Detection Systems (HIDS) are systems that detect unusual, unauthorized, and/or hostile activities at a host level within a computer network. HIDSs may be used to detect and/or prevent activities that may compromise system security, and/or may detect and/or prevent an attempted unauthorized intrusion of a component within the network while the intrusion is in progress. Additionally, HIDSs may provide a view of unusual activity at a particular host and may issue alerts notifying administrators of the suspect activity. Further, HIDSs may block a suspected connection altogether. Host-based in intrusion preventions systems (HIPS) are an installed as a software package that monitors a single host for suspicious activity by analyzing events occurring within that host. HIPS operate to prevent malware from operating by monitoring the behavior of code. As such, HIPS allow for maintaining system security for the single host without depending on a specific threat to be added to a detection update.

For an enterprise entity, a huge amount of security data may be created by various HIDSs installed on multiple hosts on the enterprise network. Currently HIDSs only monitor one side of a conversation—e.g., incoming data received by a device or outgoing data leaving the device. However, HIDSs are not able to correlate monitoring of incoming communication packets with outgoing communication packets, such as, for example, identifying a full network conversation (e.g., correlated incoming and outgoing messages) of one or more communication protocols, (e.g., transmission control protocol/Internet protocol (TCP/IP), User Datagram Protocol (UDP), and the like) and, therefore are incapable of showing an origination device for incoming communication data packets or a destination device for outgoing communication data packets. The lack of fully observable communications leaves room for a malicious actor (e.g., an inside threat actor or external threat actor that may have compromised an enterprise computing network) to search for vulnerabilities without worrying about alerting anyone that the packets being sent are to propagate access for an intruder and/or to steal data.

The network correlation engine may monitor inbound and/or outbound connections on each host computer system on a network. Such correlations may be used to supplement a HID 5-based solution with the network traffic correlation engine working in unison with the HIDS of each host. For example, a central connection broker or network traffic correlation engine may be located in a central location and may be communicatively coupled to the HIDS installed on each host in the enterprise network. As such, where a HIDS solution would report intrusions into individual host devices, the network traffic correlation engine may correlate connections between hosts.

In an illustrative example, computing device A may make an outbound connection, which may be registered with the network traffic correlation engine. Computing device B may receive an inbound connection, which may be registered with the network traffic correlation engine. The network traffic correlation engine may then utilize data from each host (e.g., computing device A (e.g., Host A), computing device B (e.g., Host B), and the like) and may determine whether the connections are legitimate or not based on, for example, the configured environments (e.g., desktop to desktop, desktop to server, server to server, and the like) and, if necessary, may generate real time alerts. If the network traffic correlation engine identified unmatched outbound and inbound connections, the network traffic correlation engine may generate an alert to trigger further investigation and may also provide a mapping of the communications showing a possible start device for the connection and/or a type of access that the connections may now be providing.

Having both ends of the connection report, for inbound and outbound connections, allows the network traffic correlation engine to identify a situation where Host A has been compromised to such that the connection reporting has been disabled. The network traffic correlation engine, based on the connections data reported from Hosts A and B, could identify inbound connections being reported by Host B but no corresponding outbound connections being reported by Host A. This lack of information for both sides of the connection would cause the network traffic correlation engine to trigger an alert, as this situation would be anomalous.

In some cases, the network traffic correlation engine may use such information to identify and map a traffic profile of a given network, which may identify connection-based "top talkers" and may allow for more network resources (e.g., bandwidth) to be placed at high utilization points and key bottle necks within the network infrastructure.

In some cases, the network traffic correlation engine may correlate communication information aggregated from a plurality of host computing devices. The network traffic correlation engine may correlate information associated with a communication link between two devices utilizing connection information from each device to provide alerting, logging, and/or status information for pattern recognition, incident response and network profile mapping. The network traffic correlation information augments information captured by a HIDS solution. For example, if Host A makes connections to 100 computing devices, each of the 100 computing devices will only see a single connection attempt. As such, based on the inbound connection information at each of the 100 computing devices, this connection attempt may fall under a predefined alert threshold. If, however, Host A also reports all its outbound connections to the network traffic correlation engine, the network traffic correlation engine may identify an unusual amount of outbound connections to devices Host A has otherwise no history (or indeed need of) accessing.

In an enterprise network, mapped drives or network logon events between two or more host-based systems (e.g., host to host communications) tend to be unusual with the exception of support personnel actively fixing an issue and/or pushing an update that would otherwise originate from a host to server-based connection. As such, lateral movement including unauthorized and/or unexpected host to host communications may be an indication of potentially malicious, or otherwise unauthorized, activities on an enterprise network. Lateral movement may include three main stages: reconnaissance, credential/privilege gathering and escalation, and gaining access to other computers in the network.

During reconnaissance, an unauthorized individual (e.g., an attacker) observes, explores and/or maps the network, its users, and/or devices. Such mappings may allow the intruder to understand host naming conventions and network hierarchies, identify operating systems, locate potential payloads, and acquire intelligence to make informed moves. Further, threat actors deploy a variety of tools to discover a current network location, accessible computing resources, and may identify firewalls or other deterrents that are in place. Using this information, an attacker may then leverage many external custom tools and/or open-source tools to perform port scanning, proxy enumeration as well as other techniques and/or the like. Further, if the attacker employs built-in operating system tools or functionality or any additional associated support tools added to the underlying operating system (OS) by support staff, any attack or intrusion may be harder to detect.

Various built-in tools can be used during reconnaissance. For example, a network status tool may show a machine's current network connections. This information may be used for gaining knowledge about the network. Operating system configuration tools may provide access to the network configuration and location information. Network address files (e.g., an Address Resolution Protocol (ARP) cache) may provide information about IP addresses assigned to physical computing device addresses (e.g., a machine access control (MAC) address). This information can help identify potential target machines or devices inside the network. Routing information (e.g. a local routing table) may include communication paths for a connected host and pathways in and out of a network. Further, command line and scripting tools, allow quick identification of network systems to which the user may have administrator or an elevated level of access.

Once an unauthorized individual has identified critical areas to access, login credentials may be gathered to allow entry. To move through a network, an attacker first needs valid login credentials, which, for example, may be obtained through unauthorized methods such as "credential dumping." For example, users may be tricked into sharing credentials by using one or more social engineering tactics such as typosquatting, vishing, and/or phishing attacks. Additional methods may include "Pass the Hash" or "Pass the Ticket". These techniques provide methods of authenticating a user by taking advantage of authentication protocol characteristics, without having access to the user's password. Pass the Hash standard authentication works by capturing valid password hashes that, once authenticated, allow the attacker to perform actions on local or remote systems. Pass the Ticket allows unauthorized individuals who have compromised a domain controller to generate a "ticket" (e.g., "golden", "silver", and the like) and save it offline, which will then remain valid indefinitely and can be used to impersonate a user, even after the user's password is reset. Some tools may be used to capture cached plain text passwords and/or authentication certificates from the memory of a compromised machine, which can then be used to authenticate to other machines. Additional tools, such as keylogging tools, may be used by unauthorized individuals to capture passwords directly when an unsuspecting user enters them via the keyboard. Once access to network resources has been established, internal network reconnaissance and subsequent bypassing of security controls to compromise successive hosts may be repeated, such as until the target data has been found and exfiltrated.

With administrative privileges secured, an unauthorized individual may gain deeper access into a network. In such cases, malicious lateral movement can be very difficult to detect because it can appear to be "normal" network traffic. As such, finding and removing network intrusions quickly is essential to avoid losses. Breakout time is the time it takes for an unauthorized individual to move laterally into other computing systems in the network after initially compromising patient zero. An organization has a short period of time to detect, investigate, and/or remediate or contain the threat. With longer times, the unauthorized individual has a better chance of accessing or destroying critical data and resources.

FIG. 1 shows an illustrative computing environment 100 to correlate network traffic in a networked computing environment in accordance with one or more aspects described herein. The illustrative computing environment 100 may include a plurality of computing devices (e.g., a network traffic correlation server 110, a computing device 112, a computing device 114, a host 132, a host 136, and the like) communicatively coupled via a public network 105 and/or a private network 115 to an enterprise computing system (e.g., enterprise computing infrastructure 102). The private network may be connected to one or more computing devices of the enterprise computing infrastructure 102 and/or devices external to the enterprise infrastructure (e.g., computing device 112). The enterprise computing system may include one or more computer machines or systems providing products and/or services to a plurality of users.

In addition, the computer machines may include one or more computing devices providing security functionality including, for example, intrusion detection, event logging, monitoring and investigation of lateral movements, generation of alerts reporting suspected lateral movements, preparation of reports regarding lateral movements, machine learning, and/or performing remediation. The security functionality may be performed on a dedicated security computing machine and/or the security functionality may be distributed over a plurality of computing devices and/or processes. The computing environment 100 may include a plurality of host computing devices (e.g., host 132, host 134, host 136, servers, client computing devices, desktop computing devices, workstations and the like). In some cases, the security functionality to identify and/or generate alerts corresponding to suspicious communications identified on the private network 115, may be performed by a network traffic correlation engine 120, which may include a rules engine 122, a data store 124 and an alert engine 126. In some cases, the network traffic correlation engine 120 may operate from a central location (e.g., on the network traffic correlation server 110). In such cases, a central network traffic correlation server 110 may coordinate with agents or other applications on individual computing devices to pass data to be analyzed to the central network traffic correlation server 110. The hosts and/or servers may include one or more data stores storing network communications. Each element in computing environment 100 may include one or more computing machines and associated components operating computer software and data configured to perform one or more functions described herein.

In addition, and as illustrated in greater detail below, hosts and/or servers may be configured to perform various distributed processing functions described and store, access, and/or act on enterprise data and/or security data. An enterprise computing infrastructure 102 may include one or more computer machines and/or other computer components. In addition, the enterprise computing infrastructure 102 may be configured to provide various enterprise and/or back-office computing functions for an organization. In some cases, the enterprise computing infrastructure 102 may load data from an enterprise data storage platform, manipulate and/or otherwise process such data, and return modified data and/or other data to the enterprise data storage platform and/or to other computer machines or systems in the computing environment 100.

The hosts and servers of the computing environment and the computing devices 112 and 114 may be any type of computer machine and may be linked to and/or used by a specific enterprise user (who may, e.g., be an employee or other affiliate of an enterprise organization controlling and/or interacting with a particular computing device). In some cases, a host (e.g., host 134) may be considered to be an administrative computing device, which may be any type of computer machine and may be linked to and/or used by an administrative user (who may, e.g., be a network administrator of an enterprise organization controlling and/or interacting with computer devices of the enterprise infrastructure 102). In some cases, the computing device 114 may by be any type of computer machine and may be linked to and/or used by one or more external users (who may, e.g., not be associated with an enterprise organization). The computing device 112 may be any type of computer machines and may be linked to and/or used by one or more internal users authorized to access the devices of the enterprise infrastructure. For example, the computing environment 100 may include a private network 115 that may interconnect hosts and servers of the enterprise infrastructure 102, and/or one or more other computer machines or systems, which may be associated with an organization), and a public network 105 that may interconnect the enterprise computer system with the private network 115 and/or one or more other computer machines such as computing device 114, systems, public networks, sub-networks, and/or the like).

In one or more arrangements, computer machines and the other systems in the computing environment 100 may be any computing device capable of providing a user interface, receiving input via the user interface, acting on the input, accessing or processing big data, controlling other computer machines and/or components thereof based on the input, and communicating the received input to one or more other computing machines. As noted above, and as illustrated in greater detail below, any and/or all of the computer machines of the computer environment 100 may, sometimes, be special-purpose computing devices configured to perform specific functions.

Enterprise computing infrastructures (e.g., a corporate network, a government network, an educational institution network and the like) may lack procedures and/or applications capable of identifying in real time lateral movement between hosts (e.g., host-to-host communication). Such communications may be legitimate communications (e.g., support personnel performing an update or other support services), however, in some cases, host-to-host communication may be associated with a network intruder, a malicious inside threat, and/or an otherwise unauthorized user attempting to gain access to private information stored on the network. Few applications provide real-time network traffic validation, such as by associating a user and device type to a particular connection.

In general, normal network communications rarely utilize mapped drives and/or network login events between host computing devices (e.g., between host 132 and host 134). Such communications are unusual except, for example, communications initiated by support personnel from their machine (e.g., host 134) to correct a problem or to perform an update on another computing device (e.g., a user computing device, the host 132, and/or the like). The network traffic correlation engine 120 may be a centrally located host-based application that may include the rules engine 122 to analyze network connections to and from different computing devices over the private network 115 and, for example, may make alerting decisions based on enumeration and/or correlation of information from network communication logs, network communications monitoring applications, network security applications, and/or event logs. The rules, algorithms, models, and/or knowledge base may be stored in the data store 124. The network traffic correlation engine may receive and may utilize one or more machine learning algorithms to analyze data to determine if a network connection is initiated from another host or initiated locally to another host rather than a server, a time of day of the network connection, information enumerated from an operating system directory service based on identification information of the host (e.g., host 132, host 134, host 136) making the connection, information corresponding to network devices to which the host (e.g., host 132, host 134, host 136) typically communicates, and log files identifying the type of connection, the account making the connection, and the device ID making the connection.

In some cases, the alert module 126 of the network traffic correlation engine 120 may be configured to push or pull alerts over the private network 115 and may send at least a portion of the stored data to a different device, such as for forensics purposes and/or to facilitate an ability for a backup copy to be pushed to a remote network storage device (e.g., a data store operating on a remote host device or the like). Alerts may be presented locally to the network traffic correlation server via a user interface and/or may be communicated via the network to a different computing device for dissemination to a user depending on a specified configuration.

The HIDSs (e.g., HIDS 140) monitoring each host (e.g., host 132, host 134, host 136) may be configured to monitor communications to and from the particular host and, in some cases, to communicate monitoring information to the network traffic correlation server 110. In some cases, the network traffic correlation engine 120 may pull monitoring information from HIDS 140 of one or more host computing devices. In some cases, the HIDS 140 may monitor log files generated by applications operating on the host and may generate a historical record of activities and/or functions performed by the applications. This historical information may allow the network traffic correlation engine 120 to quickly analyze them for information about communications received by a particular host (e.g., host 132) and/or sent from the particular host. For example, the historical information analysis may identify signs that an intrusion may have occurred. In some cases, log files may be compiled and/or organized to facilitate greater search efficiencies.

In some cases, network traffic correlation engine 120 may be configured to obtain and/or aggregate network communication information associated with a plurality of computing devices communicating via the private network 115. For example, the network traffic correlation engine 120 may aggregate information from a HIDS associated with each of the computing devices on the network and/or from one or more network-based intrusion detection system (NIDS) 142.

The HIDS 140 may monitor log files generated by applications running on the associated host (e.g., host 132), creating a historical record of activities and functions. In some cases, the network traffic correlation engine 120 may compile the HIDS information received from each host 132 in a common format (e.g., aligned with a particular the directory structure of a log file server), to allow for searching and/or sorting by application, date, incoming communications, outgoing communications, and/or other metrics. In some cases, the HIDS 140 may communicate information associated with suspect events and/or activity that may indicate possible malicious activity. HIDS 140 may monitor the traffic and/or suspicious activity on the specific host on which they are installed. The NIDS 142 may monitor network-based traffic and activity. While both NIDS and HIDS analyze log and event messages the system generates, NIDSs analyze packet data as information moves across a network. Because malicious actors may vary methods of intrusion to be more unpredictable and less easily traced, the network traffic correlation engine 120 may allow for identification of unmatched messages that may be missed by use of the HIDS 140 and/or NIDS alone.

In some cases, the network traffic correlation engine 120 may aggregate the information received from the plurality of HIDS 140 and/or NIDS 142 associated with one or more of the computing devices on the enterprise network. In some cases, the network traffic correlation engine 120 may analyze the HIDS information received from each host to identify at least a source and a destination of each incoming and outgoing communication connection. In some cases, the network traffic correlation engine 120 may analyze additional information included in the OS logging information, domain and HIDS information including, for example, a host name, a local user name a date and/or time, a service identifier, a machine identifier, an internet protocol (IP) address, processing time information, data size of sent data, data size of received data, status information, operating system information, operation information, target device information, parameter information, and/or the like.

The network traffic correlation engine 120 may analyze the aggregated information to identify anomalous communications that may be indicative of unauthorized access of one or more devices on the enterprise network. For example, the network traffic correlation engine 120 may identify a case where a host (e.g., host 132) has no record of outbound messaging for a particular time and/or to particular targets, when one or more different hosts (e.g., host 134, host 136) indicates that a message was received from host 132. Such situations may be indicative of an attack, where the compromised machine (e.g., host 132) has logging of outbound messaging disabled. Similarly, a host 132 may output a large number of messages (e.g., 100 messages), each to a different target host. Such messages maybe logged only once at the target computing device, such that a HIDS system may not flag the message as being suspicious. However, the network traffic correlation engine 120 may correlate communication logs from each device on the enterprise network, such that a pattern that host 132 is broadcasting and/or receiving large amounts of messages to multiple hosts, within a short timeframe. Additionally, the network traffic correlation engine 120 may identify situations where unusual user access situations (e.g., login to different devices, multiple concurrent device logins, user access at unusual times) may correspond to unusual network activity events.

Figure 2:
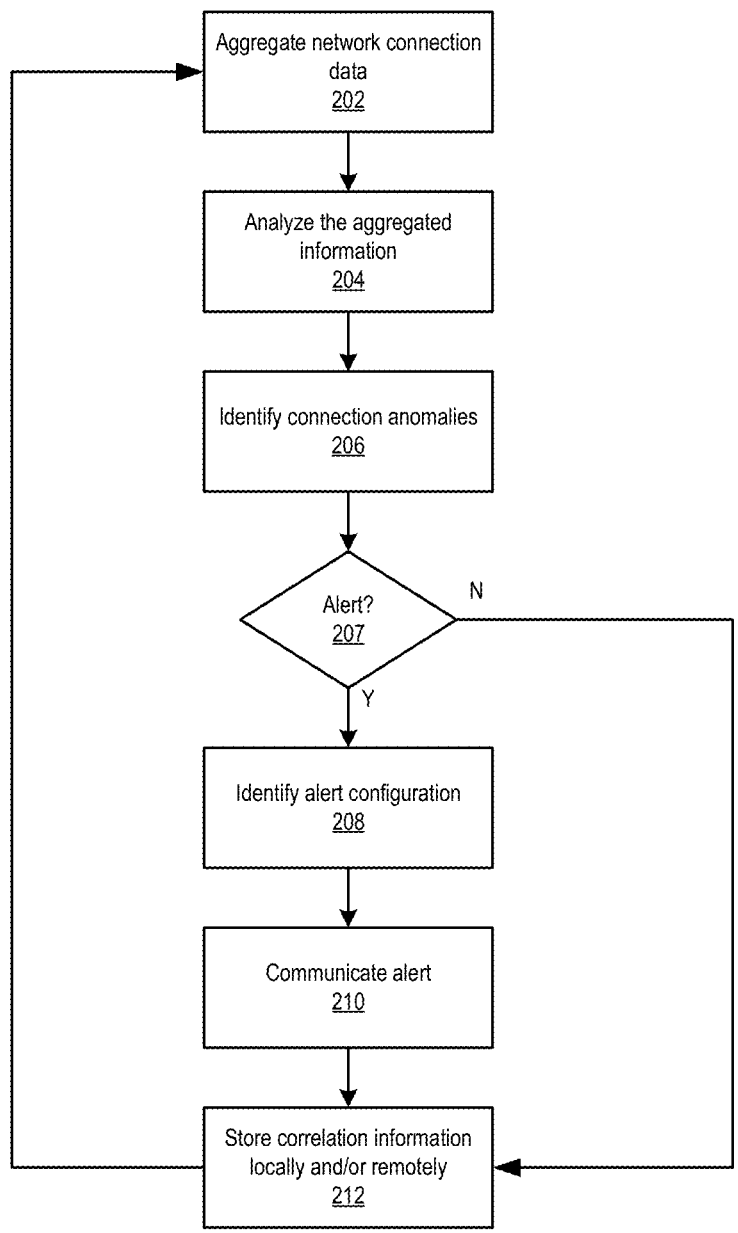
FIG. 2 shows an illustrative method for correlating network messages in a computing environment in accordance with one or more aspects described herein.

FIG. 2 shows an illustrative method for correlating network messages in a computing environment in accordance with one or more aspects described herein. At 202, the network traffic correlation engine may aggregate network communication data from a plurality of devices on the enterprise network. For example, the network traffic correlation engine may collect data from a plurality of network logs, such as information processed by a HIDS 140 system associated with a host device. At 204, the network traffic correlation engine 120 may analyze the aggregated data such as by using the rules engine 122. The rules engine 122 may access one or more rules stored in the data store 124. For example, the network traffic correlation engine 120 may process rules to identify, via analysis using the rules engine 122, communications to and/or from different computing devices on the enterprise network. In some cases, the rule engine 122 may correlate outbound connections from a first computing device (e.g., host 134) to inbound connections received by at least one different host (e.g., host 132 and/or host 134). Based on the analysis, the network traffic correlation engine 120 may identify a connection anomaly, such as an indication of host to host communication (e.g., a host 134 as a source device and a host 132 as a destination device).

After a communication in the aggregated network traffic data is identified as a possible anomalous communication, the network traffic correlation engine 120 may analyze associated data to determine a possibility of a security threat (e.g., a risk score) associated with the possible lateral movement. In some cases, the rules engine 122 may identify a user and or a user group associated with a machine initiating the communication path, a time of day that communications are occurring, an amount of data accessed or transferred, a type of data to be accessed or transferred, a permission level associated to the data and/or the user or user group, a source and/or destination of a data transfer, and the like. The network traffic correlation engine 120 may analyze aggregated communication packets to identify one or more users and/or user groups that may be associated with the suspect communications, a source computing device and/or a destination computing device. In some cases, the network traffic correlation engine 120 may analyze the aggregated communication information to identify signs of host scanning, such as by identifying whether attempts to connect to multiple destination ports such as by analyzing network flow logs and/or firewall logs and correlating the scan data to a port associated with suspect communications.

In some cases, the network traffic correlation engine 120 may analyze connection information to determine an amount of data being transferred and/or a type of data being transferred. For example, the rules engine 122 may learn patterns of use associated with service or information technology (IT) group users transferring updates to operating systems and/or applications via a host to host connection. However, a file transfer initiated from a machine associated with a user associated with a sales group or a human resources group may be unlikely. As such, the rules engine 122 may associate a higher likelihood (e.g., a greater weight) of improper activity to data transfers initiated from an unlikely host device.

At 207, the network traffic correlation engine 120 and/or the alert engine 126 may determine whether to send an alert. If no alert is to be sent, based on an output of an analysis by the rules engine 122, any identified anomalous data may be archived and/or stored in a data store, such as data store 124. If so, then at 208, the network traffic correlation engine 120 and/or the alert engine 126 may analyze an alert configuration stored in the data store 124 to identify a format and/or an alert type to be sent. At 210, the alert is sent via the private network 115 to one or more recipients for display at a remote computing device. For example, the alert configuration may specify an alert type (e.g., an email, a text, an instant message, a phone call, and the like) based on a severity of the risk, a location of the host, and the like. For example, for critical hosts and/or information, an alert may be triggered to be sent to an IT manager and/or communications to and from a particular host 134 may be shutdown, at least temporarily. In some cases, e.g., for risk scores close to the threshold value, alerts may be sent, but communications may be allowed to continue, such as under supervised conditions. In some cases, the alert may be pushed as a visual or audio indication at a user interface at a central location on the private network 115, on a user interface associated with the local host 134, on a user interface at a destination host (e.g., host 132) of the host to host connection, and/or at a user interface of a remote computing device 112 (e.g., a mobile device, a desktop device, a computing device at a security center, and the like).

At 212, the correlation information identified by the network traffic correlation engine 120 may be stored in a data store (e.g., data store 124) to be used by the network traffic correlation engine 120 to train one or more rules algorithms and/or to a remote data store and monitoring of the network communication continues at 202.

Figure 3:
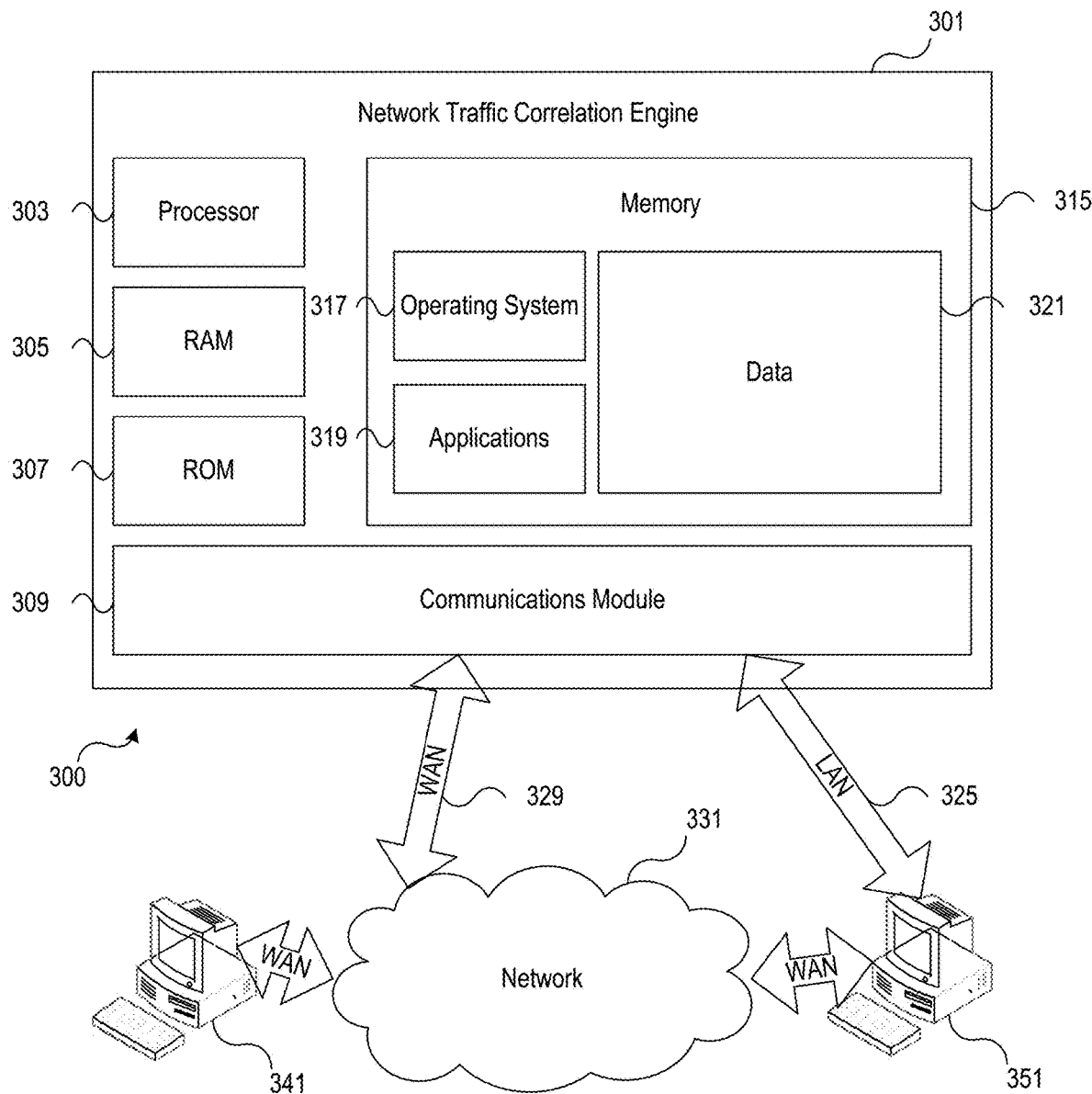
FIG. 3 shows an illustrative computing environment in which various aspects of the disclosure may be implemented in accordance with one or more aspects described herein.

FIG. 3 shows an illustrative operating environment in which various aspects of the present disclosure may be implemented in accordance with one or more illustrative embodiments. Referring to FIG. 3 a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative network traffic correlation engine 301 having a processor 303 for controlling overall operation of the network traffic correlation engine 301 and its associated components, including a Random Access Memory (RAM) 305, a Read-Only Memory (ROM) 307, a communications module 309, and a non-transitory memory 315. The network traffic correlation engine 301 may include a variety of computer readable media and/or computer readable and writeable media. Computer readable media may be any available media that may be accessed by the network traffic correlation engine 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the network traffic correlation engine 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the network traffic correlation engine 301. Such a processor may execute computer-executable instructions stored on a computer-readable medium.

Software may be stored within the memory 315 and/or other digital storage to provide instructions to the processor 303 for enabling the network traffic correlation engine 301 to perform various functions as discussed herein. For example, the memory 315 may store software used by the network traffic correlation engine 301, such as an operating system 317, one or more application programs 319, and/or an associated database 321. In addition, some or all of the computer executable instructions for the network traffic correlation engine 301 may be embodied in hardware or firmware. Although not shown, the RAM 305 may include one or more applications representing the application data stored in the RAM 305 while the network traffic correlation engine 301 is on and corresponding software applications (e.g., software tasks) are running on the network traffic correlation engine 301.

The communications module 309 may include a microphone, a keypad, a touch screen, and/or a stylus through which a user of the network traffic correlation engine 301 may provide input, and may include one or more of a speaker for providing audio output and a video display device for providing textual, audiovisual and/or graphical output. The computing system environment 300 may also include optical scanners (not shown).

The network traffic correlation engine 301 may operate in a networked environment supporting connections to one or more remote computing devices, such as the computing devices 341 and 351, and the like. The computing devices 341 and 351 may be personal computing devices or servers that include any or all of the elements described above relative to the network traffic correlation engine 301.

The network connections depicted in FIG. 3 may include a Local Area Network (LAN) 325 and/or a Wide Area Network (WAN) 329, as well as other networks. When used in a LAN networking environment, the network traffic correlation engine 301 may be connected to the LAN 325 through a network interface or adapter in the communications module 309. When used in a WAN networking environment, the network traffic correlation engine 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
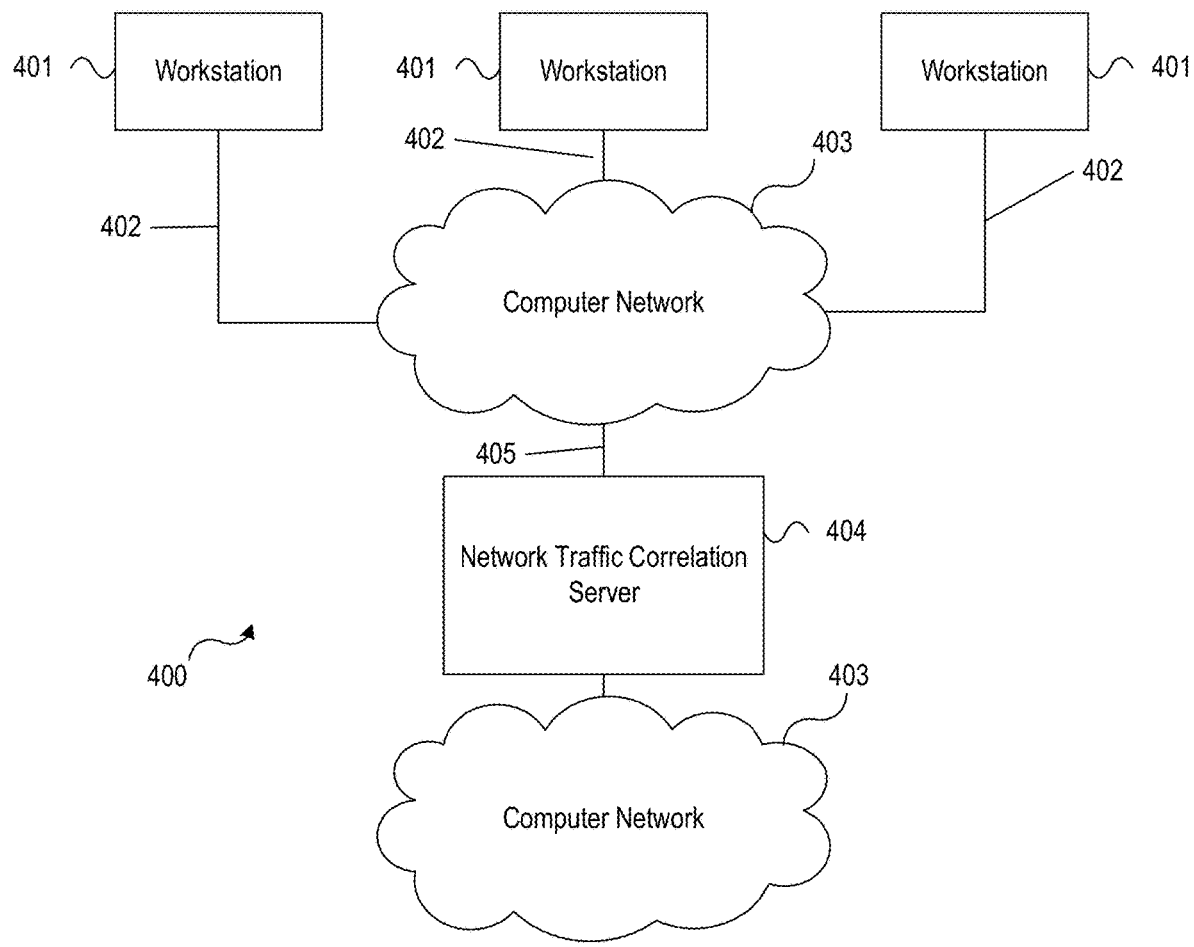
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to a network traffic correlation engine 404. In the system 400, the network traffic correlation engine 404 may be a server, processor, computer, or data processing device, or combination of the same, configured to perform the functions and/or processes described herein. The network traffic correlation engine 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the network traffic correlation engine 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system comprising:
   a plurality of hosts on an enterprise network, each host of the plurality of hosts sending communications via the enterprise network; and
   a computing device, comprising:
   a processor; and
   non-transitory memory storing instructions that, when executed by the processor, cause the computing device to:
   monitor, by a network traffic correlation engine, network communications aggregated from the plurality of hosts on the enterprise network, wherein the network communications comprises inbound and outbound connection information received from each host on the enterprise network;
   identify, by the network traffic correlation engine, whether a correlation exists between a first communication sent from a first host device via the enterprise network to a second host device and a second communication received via the enterprise network by the second host device;
   determine, based on whether a correlation exists between the first communication and the second communication, whether an anomalous communication condition exists; and
   trigger, based on the correlation, an alert identifying that the anomalous communication condition is present between the first host device and the second host device.

2. The system of claim 1, wherein the instructions, when executed, cause the computing device to:
   aggregate information from a plurality of network communication services and data logs, wherein the information corresponds to a plurality of network communication connections to and from the first host device and the second host device.

3. The system of claim 1, wherein the instructions, when executed cause the computing device to:
   match messages received by the first host device to messages sent by the second host device based on aggregated communication information to detect an anomalous communication on the enterprise network.

4. The system of claim 1, wherein triggering the alert comprises providing an indication of the alert on a user interface device at a central location on the enterprise network.

5. The system of claim 1, wherein the anomalous communication condition comprises an indication that logging of sent messages was disabled.

6. The system of claim 1, wherein monitoring of network communications information aggregated from a plurality of hosts on the enterprise network comprises aggregating information received from a plurality of host intrusion detection systems each associated with a different host device.

7. A method comprising:
   monitoring, by a network traffic correlation engine, network communications based on aggregated information from each host of a plurality of hosts on an enterprise network, wherein the network communications comprises inbound and outbound connection information;
   identifying, by the network traffic correlation engine, whether a correlation exists between a first outbound communication sent from a first host device and a second inbound communication received by a second host device; and
   triggering, based on the correlation, an alert identifying that an anomalous communication condition is present between the first host device and the second host device, wherein the anomalous communication condition comprises an indication of host to host communication.

8. The method of claim 7, comprising:
   aggregating information from a plurality of network communication services and data logs, wherein the information corresponds to a plurality of network communication connections to and from the first host device and the second host device.

9. The method of claim 7, comprising,
   matching messages received by the first host device to messages sent by the second host device based on aggregated communication information to detect the anomalous communication condition on the enterprise network.

10. The method of claim 7, wherein triggering the alert comprises providing an indication of the alert on a user interface device at a central location on the enterprise network.

11. The method of claim 7, wherein the anomalous communication condition comprises an indication that logging of sent messages was disabled.

12. The method of claim 7, wherein the monitoring of network communications information aggregated from a plurality of hosts on the enterprise network comprises aggregating information received from a plurality of host intrusion detection systems each associated with a different host device.

13. The method of claim 7, further comprising determining, based on whether a correlation exists between a first communication and a second communication, whether an anomalous communication condition exists.

14. One or more non-transitory computer-readable media storing instructions that, when executed by a host computing device comprising a processor, memory, and a communication interface, cause the host computing device to:
   aggregate, by a network traffic correlation engine, network communications information from a plurality of hosts on an enterprise network, wherein the network communications information comprises inbound and outbound connection information associated with each host on the enterprise network;

identify, by the network traffic correlation engine, whether a correlation exists between a first outbound communication sent from a first host device and a second inbound communication received by a second host device; and trigger, based on the correlation, an alert identifying that an anomalous communication condition is present between the first host device and the second host device, wherein the anomalous communication condition comprises an indication of host to host communication.

15. The one or more non-transitory computer-readable media of claim 14, wherein the instructions, when executed by the processor, cause the host computing device to:

aggregate information from a plurality of network communication services and data logs, wherein the information corresponds to a plurality of network communication connections to and from the first host device and the second host device.

16. The one or more non-transitory computer-readable media of claim 15, wherein the instructions, when executed by the processor, cause the host computing device to:

match messages received by the first host device to messages sent by the second host device based on the aggregated information to detect an anomalous communication on the enterprise network.

17. The one or more non-transitory computer-readable media of claim 14, wherein triggering the alert comprises providing an indication of the alert on a user interface device at a central location on the enterprise network.

18. The one or more non-transitory computer-readable media of claim 14, wherein an anomalous communication condition comprises an indication that logging of sent messages was disabled.

19. The one or more non-transitory computer-readable media of claim 14, wherein monitoring of network communications information aggregated from a plurality of hosts on the enterprise network comprises aggregating information received from a plurality of host intrusion detection systems each associated with a different host device.

20. The one or more non-transitory computer-readable media of claim 15, wherein the instructions further cause the host computing device to determine, based on whether a correlation exists between a first communication and a second communication, whether an anomalous communication condition exists.

* * * * *